United States Patent
Tamura

(10) Patent No.: US 10,552,102 B2
(45) Date of Patent: Feb. 4, 2020

(54) IMAGE FORMING APPARATUS, AND WEB SERVER SYSTEM FOR GENERATING CONTENT BASED ON DETECTED CHANGE

(71) Applicant: FUJI XEROX CO., LTD., Tokyo (JP)

(72) Inventor: Junichi Tamura, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/689,085

(22) Filed: Aug. 29, 2017

(65) Prior Publication Data

US 2018/0253266 A1 Sep. 6, 2018

(30) Foreign Application Priority Data

Mar. 2, 2017 (JP) ................................. 2017-039190

(51) Int. Cl.
*G06F 3/12* (2006.01)
(52) U.S. Cl.
CPC .......... *G06F 3/1231* (2013.01); *G06F 3/1236* (2013.01); *G06F 3/1287* (2013.01)
(58) Field of Classification Search
CPC .... G06F 3/1231; G06F 3/1236; G06F 3/1287; G06F 16/00

USPC ......................................... 358/1.1–1.18, 402
See application file for complete search history.

(56) References Cited

U.S. PATENT DOCUMENTS

| | | | | |
|---|---|---|---|---|
| 9,454,285 | B1* | 9/2016 | Cai | G06F 3/04817 |
| 2003/0011802 | A1* | 1/2003 | Nakagiri | G06F 3/1205 358/1.13 |
| 2003/0177202 | A1* | 9/2003 | Suda | G06F 16/95 709/218 |
| 2014/0059420 | A1* | 2/2014 | Cole | G06F 17/30882 715/234 |
| 2017/0012980 | A1* | 1/2017 | Sanso | H04L 63/10 |
| 2018/0059999 | A1* | 3/2018 | Kawakami | G06F 3/1203 |
| 2018/0121270 | A1* | 5/2018 | Nitsan | G06F 11/079 |

FOREIGN PATENT DOCUMENTS

JP 2002-099477 A 4/2002

* cited by examiner

*Primary Examiner* — Gabriel I Garcia
(74) *Attorney, Agent, or Firm* — Oliff PLC

(57) ABSTRACT

A server apparatus includes a detection unit and a generation unit. The detection unit detects a change in information to be used for access to content provided by a web service. The generation unit generates, in a case where the change is detected, second content in which the information with new settings is added to first content which is associated with the information before the change.

14 Claims, 14 Drawing Sheets

FIG. 5

| DETECTED EVENT | DISPLAY CONTENTS |
|---|---|
| CHANGE IN IP ADDRESS | http://value/* |
| CHANGE IN DEVICE NAME | http://[IP]/deviceName=value |
| FOLDER RENAMING | http://[IP]/value |
| ... | ... |

FIG. 10

| DETECTED EVENT | DISPLAY CONTENTS | REFLECT WITHOUT DELAY |
|---|---|---|
| CHANGE IN IP ADDRESS | http://value/* | No |
| CHANGE IN DEVICE NAME | http://[IP]/deviceName=value | No |
| FOLDER RENAMING | http://[IP]/value | Yes |
| ... | ... | ... |

IMAGE FORMING APPARATUS, AND WEB SERVER SYSTEM FOR GENERATING CONTENT BASED ON DETECTED CHANGE

CROSS-REFERENCE TO RELATED APPLICATIONS

This application is based on and claims priority under 35 USC 119 from Japanese Patent Application No. 2017-039190 filed Mar. 2, 2017.

BACKGROUND

Technical Field

The present invention relates to a server apparatus, an image forming apparatus, and a server system.

SUMMARY

According to an aspect of the invention, there is provided a server apparatus including a detection unit and a generation unit. The detection unit detects a change in information to be used for access to content provided by a web service. The generation unit generates, in a case where the change is detected, second content in which the information with new settings is added to first content which is associated with the information before the change.

BRIEF DESCRIPTION OF THE DRAWINGS

Exemplary embodiments of the present invention will be described in detail based on the following figures, wherein:

FIG. 5 is a diagram illustrating an example of a detected event for a change in a URL detected by a URL change detection unit;

FIG. 10 is a diagram for explaining an example of items for which a change is not reflected in a system without delay and items for which a change is reflected in the system without delay;

DETAILED DESCRIPTION

Hereinafter, exemplary embodiments of the present invention will be described in detail with reference to drawings.

First Exemplary Embodiment

<System Configuration>

Figure 1:
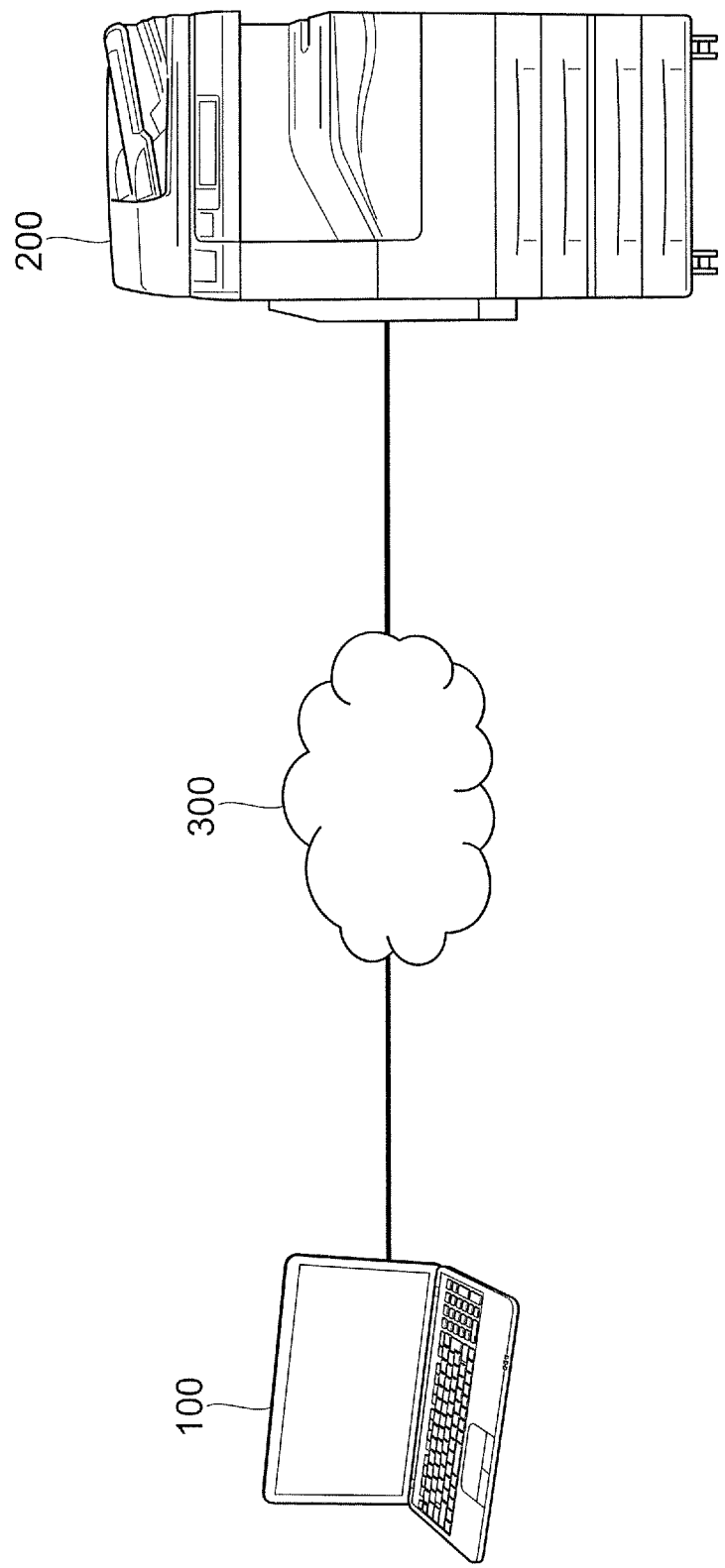
FIG. 1 is a diagram illustrating a configuration example of a server system used in a first exemplary embodiment.

FIG. 1 is a diagram illustrating a configuration example of a server system 1 used in a first exemplary embodiment.

The server system 1 includes a computer operated by a user and an image forming apparatus 200 used for printing and facsimile transmission of still images.

The computer 100 and the image forming apparatus 200 are connected via various transmission paths 300.

The computer 100 in this exemplary embodiment is an apparatus which is provided with a function of accessing a web service provided by the image forming apparatus 200, and is, for example, a notebook-type computer, a tablet-type computer, a desktop-type computer, a smartphone, or the like.

The computer 100 is an example of a client apparatus.

The image forming apparatus 200 according to this exemplary embodiment is an apparatus which forms images on a recording material such as paper, and is provided with a copy function, a scanner function, a facsimile transmission/reception function, and a printing function.

The image forming apparatus 200 is not necessarily provided with all the above functions. The image forming apparatus 200 may be an apparatus specializing in any one of the above functions, such as a copying machine, a scanner, a facsimile transmission/reception apparatus, a printer (including a three-dimensional printer), or the like.

Furthermore, the image forming apparatus 200 is also provided with a web server function which displays the internal state of the image forming apparatus 200 and the state of a job using a web browser or receiving a change of setting in the image forming apparatus 200.

Figure 2:
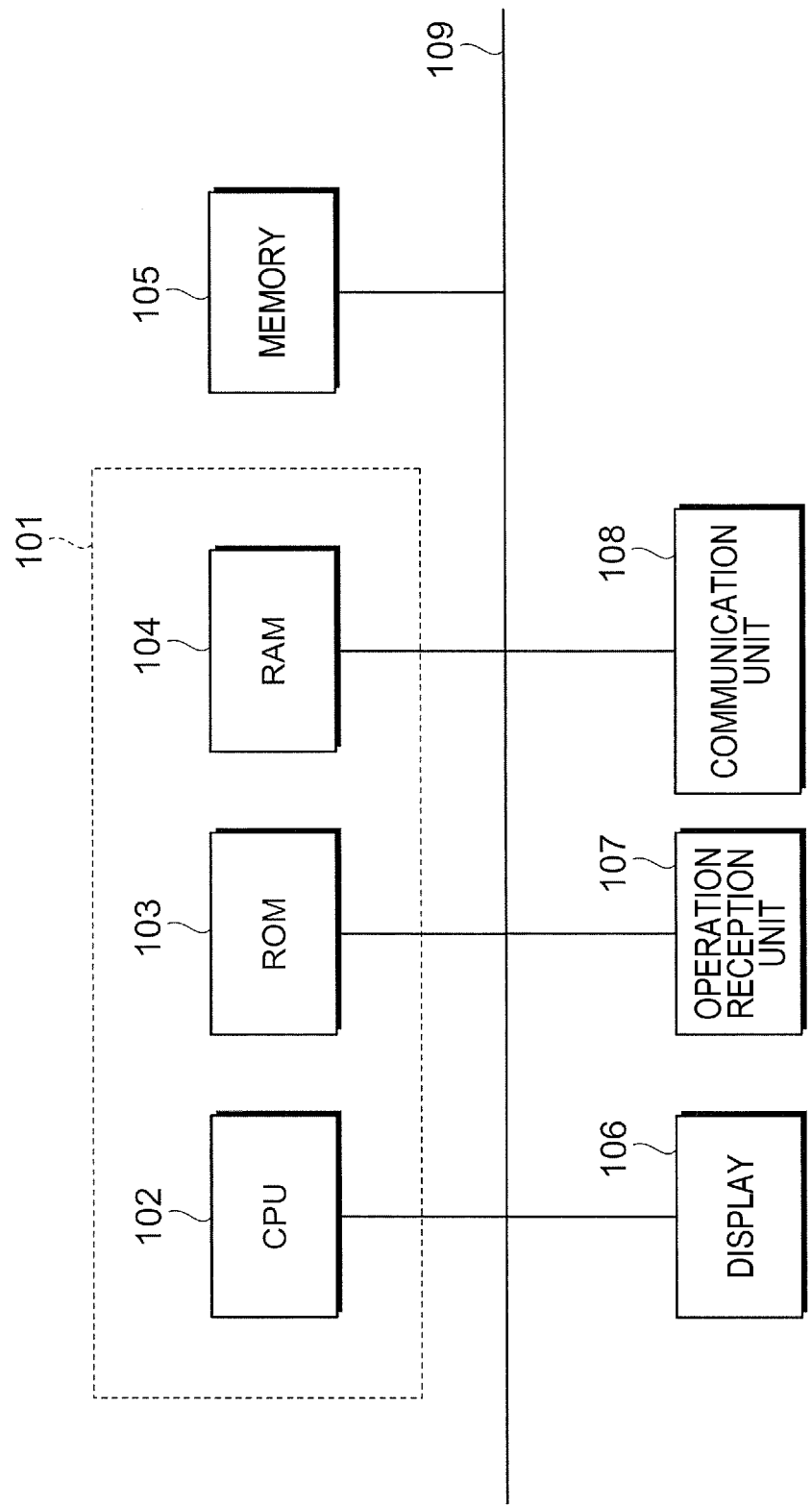
FIG. 2 is a diagram illustrating an example of a hardware configuration of a computer.

FIG. 2 is a diagram illustrating an example of a hardware configuration of the computer 100.

The computer 100 includes a controller 101 which controls the entire apparatus, a memory 105 which is used for storing image data and programs, a display 106 which is used for displaying images, an operation reception unit 107 which receives an input operation by a user, and a communication unit 108 which is used for communication with an external apparatus (for example, the image forming apparatus 200).

These units are connected with each other via a bus 109, and transmits and receives data via the bus 109.

The controller 101 is an example of a controller. The controller 101 includes a central processing unit (CPU) 102, a read only memory (ROM) 103, and a random access memory (RAM) 104.

A program to be executed by the CPU 102 is stored in the ROM 103. The CPU 102 uses the RAM 104 as an operation area, and executes the program read from the ROM 103. Each unit of the computer 100 is controlled in accordance with execution of the program. For example, a web browser, which will be described later, is also executed.

The memory 105 includes a memory device such as a hard disk device or a semiconductor memory.

The display 106 includes a display device which displays various images in accordance with execution of a program (including an operating system and firmware). The display 106 includes, for example, a liquid crystal display panel or an organic electroluminescence (EL) display panel.

The operation reception unit 107 includes an input device which receives an operation from a user, and includes, for example, a keyboard, a button, a switch, a touch pad, a touch panel, and the like.

The communication unit 108 includes, for example, a local area network (LAN) interface.

Figure 3:
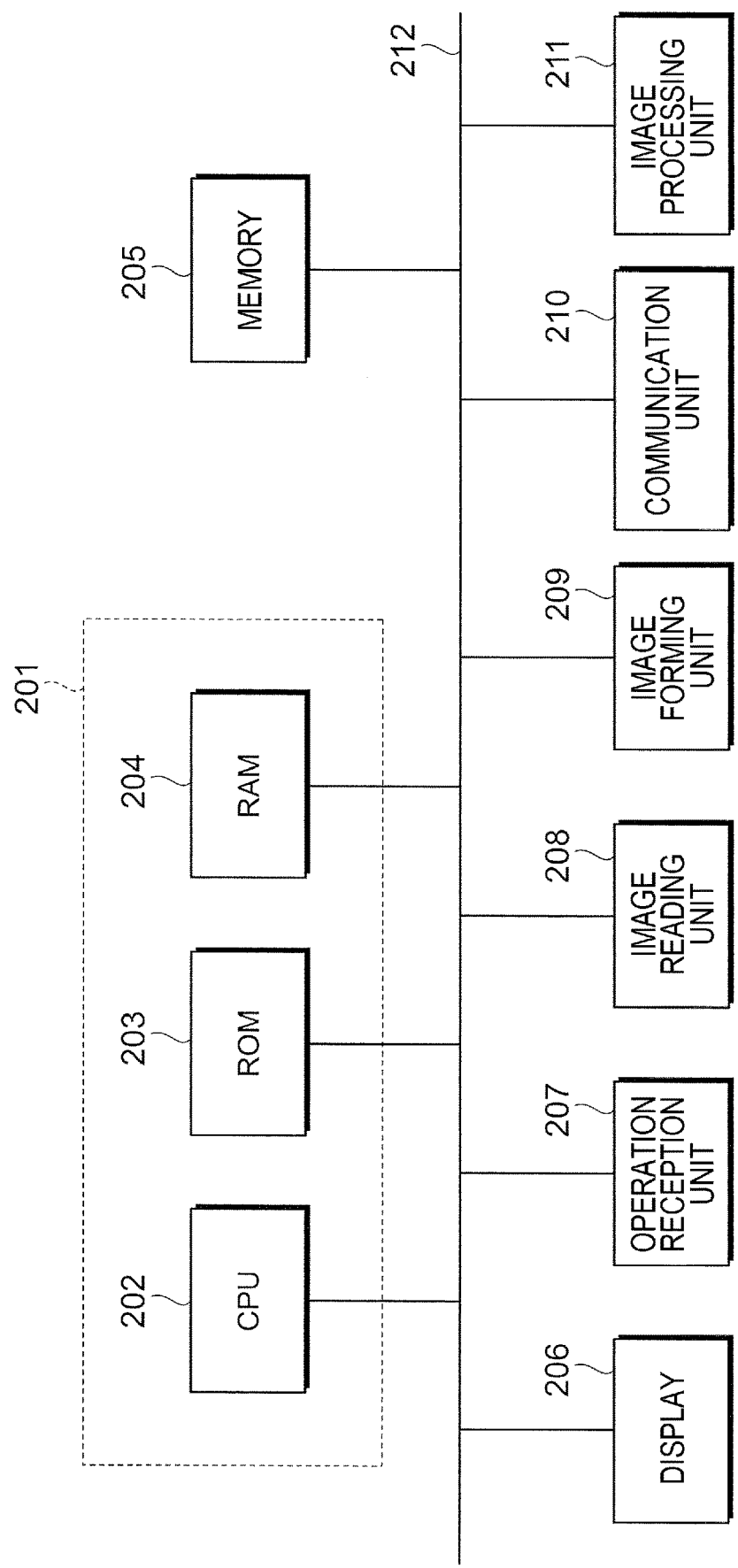
FIG. 3 is a diagram illustrating a configuration example of an image forming apparatus according to the first exemplary embodiment.

FIG. 3 is a diagram illustrating a configuration example of the image forming apparatus 200 according to the first exemplary embodiment.

The image forming apparatus 200 includes a controller 201 which controls the entire apparatus, a memory 205 which is used for storing image data and the like, a display 206 which is used for displaying an operation reception screen and images, an operation reception unit 207 which receives an input operation by a user, an image reading unit 208 which reads an image of a set original to generate image data, an image forming unit 209 which forms images on paper, which is an example of a recording material, for example, by an electrophotographic system or an inkjet system, a communication unit 210 which is used for communication with an external apparatus (for example, the computer 100), and an image processing unit 211 which performs image processing such as color correction and gradation correction on images represented by image data.

These units are connected with each other via a bus 212, and transmits and receives data via the bus 212.

The controller 201 is an example of a controller. The controller 201 includes a CPU 202, a ROM 203, and a RAM 204.

A program to be executed by the CPU 202 is stored in the ROM 203. The CPU 202 uses the RAM 204 as an operation area, and executes the program read from the ROM 203.

Each unit of the image forming apparatus 200 is controlled in accordance with execution of the program. For example, formation of images on a surface of paper, generation of read images, and the like are controlled. A function as a web server, which will be described later, is also executed in accordance with execution of the program.

The memory 205 includes a memory device such as a hard disk device or a semiconductor memory.

The display 206 includes a display device which displays various images generated in accordance with execution of a program (including an operating system and firmware). The display 206 includes, for example, a liquid crystal display panel or an organic EL display panel.

The operation reception unit 207 includes an input device which receives an operation from a user, and includes, for example, a button, a switch, a touch panel, and the like.

The image reading unit 208 is a so-called scanner device.

The image forming unit 209 is, for example, a print engine which forms images on paper, which is an example of a recording material.

The communication unit 210 includes, for example, a LAN interface.

The image processing unit 211 includes, for example, a dedicated processor which performs image processing such as color correction and gradation correction on image data.

Figure 4:
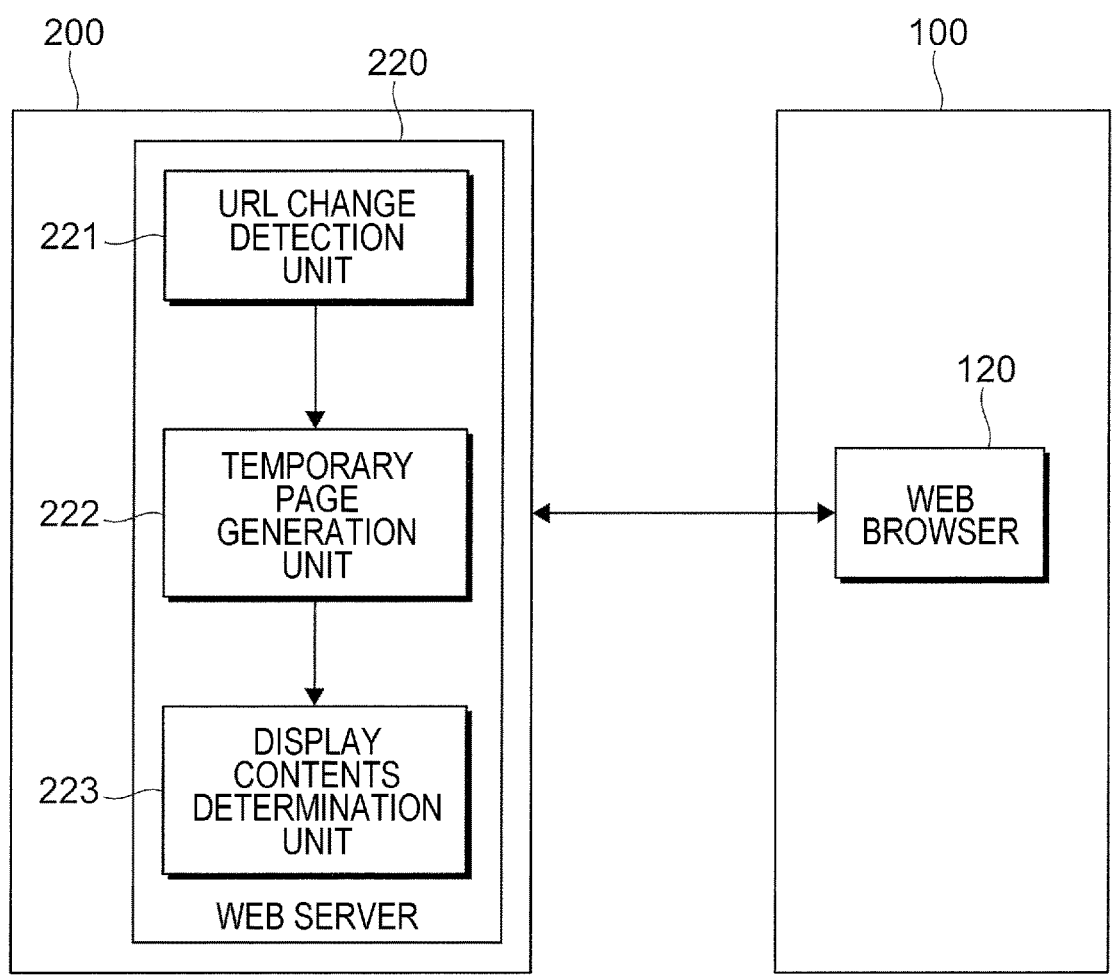
FIG. 4 is a diagram for explaining a functional configuration of the server system according to the first embodiment.

FIG. 4 is a diagram for explaining a functional configuration of the server system 1 according to the first exemplary embodiment.

In this exemplary embodiment, the controller 101 of the computer 100 functions as a web browser 120, and the controller 201 of the image forming apparatus 200 functions as a web server 220.

A top screen (an example of content) of a web service is associated with a specific internet protocol (IP) address, and individual tabs forming the top screen are associated with corresponding content.

Content associated with tabs includes, for example, a setting screen for apparatus information of the image forming apparatus 200 and an email address, a setting screen for a paper tray, a setting screen regarding paper, a setting screen for a power-saving mode, a setting screen for a destination list, a setting screen for a job flow, a setting screen regarding security, a setting screen for an email notification method, a setting screen regarding a port, a setting screen regarding a protocol, a setting screen regarding a memory, and the like.

Each of these screens is identified by a path forming a URL.

The web server 220 in this exemplary embodiment includes a URL change detection unit 221 which detects a change in a URL, a temporary page generation unit 222 which generates, when a change is detected, a temporary page by adding a URL with new settings to a standard page corresponding to a URL before the change, and a display contents determination unit 223 which determines contents to be displayed on the web browser 120.

FIG. 5 is a diagram illustrating an example of detected events for changes in a URL detected by the URL change detection unit 221.

In FIG. 5, for example, a case where an IP address of the web server 220 is changed, a device name of the web server 220 is changed, a folder name representing the storing location of a resource is changed (renamed) are illustrated.

The URL change detection unit 221 detects these events. The URL change detection unit 221 is an example of a detection unit.

Figure 6:
FIG. 6 is a diagram illustrating an example of a temporary page generated by a temporary page generation unit.

FIG. 6 is a diagram illustrating an example of a temporary page 230 generated by the temporary page generation unit 222.

The temporary page 230 in this exemplary embodiment includes a display field 231 for a URL as an access destination, an additional content 232 which is associated with a URL with new settings, and a standard page 233 which is associated with a URL before the change.

The temporary page 230 is an example of second content, and the standard page 233 is an example of first content.

The temporary page 230 illustrated in FIG. 6 includes, as the additional content 232, three pieces of information regarding a URL with new settings.

The first piece of information is a description indicating that an accessed URL is to be changed or an accessed URL has been changed.

The second piece of information is a description suggesting that a URL with the new settings should be used for the next access.

The third piece of information is the URL with the new settings. In the example of FIG. 6, the URL with the new settings "http://123.123.123.123/content.html" is displayed with a hyperlink.

Therefore, when a user clicks the hyperlink on the screen, an access destination is automatically switched to a corresponding URL. The hyperlink is an example of link information.

Information forming the additional content 232 is not limited to the illustrated three pieces of information, and FIG. 6 is merely an example.

Furthermore, the URL with the new settings may not be displayed with a hyperlink. This is because, if the URL with the new settings is described, a user is able to access the URL with the new settings by copying and pasting the URL or retyping the URL.

The temporary page generation unit 222 is an example of a generation unit.

The display contents determination unit 223 has a function of determining contents to be displayed on the web browser 120. In this exemplary embodiment, the function corresponding to the display contents determination unit 223 is implemented when access is made by the web browser 120.

In this exemplary embodiment, the above-described temporary page 230 is determined as display contents. However, if plural display contents that may be selected exist as in an exemplary embodiment described later, one of the plural display contents may be determined.

<Operation Performed by Web Server>

Next, a processing operation of the web server 220 will be explained. The web server 220 is implemented by two operations.

The first operation is an operation up to generation of the temporary page 230 in the case where a change in a URL is detected. The second operation is an operation for determining contents to be displayed on the web browser 120.

Figure 7:
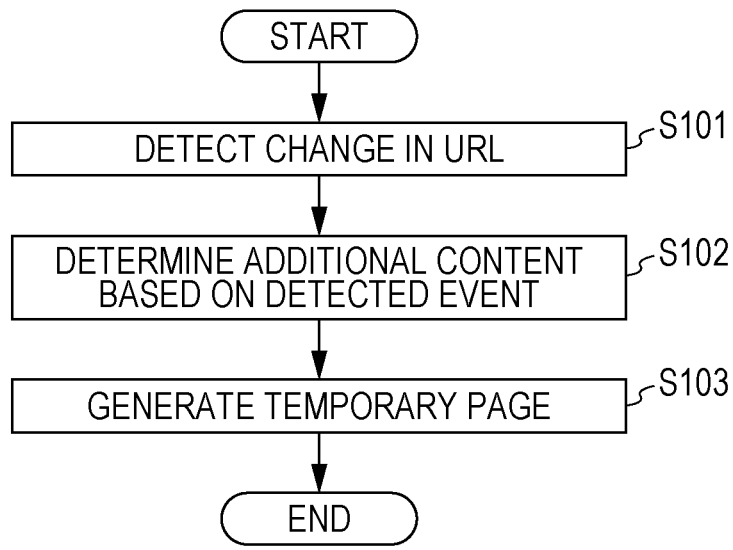
FIG. 7 is a flowchart for explaining an operation performed by a web server which has detected a change in a URL.

FIG. 7 is a flowchart for explaining an operation performed by the web server 220 which has detected a change in a URL.

The controller 201 (URL change detection unit 221) which functions as the web server 220 repeatedly monitors whether or not there is a change in the URL of a standard page under the control of the web server 220 (step 101). When a change in the URL is detected, the controller 201 proceeds to step 102.

The controller 201 (temporary page generation unit 222) which has detected the change in the URL determines the additional content 232 (see FIG. 6) corresponding to a detected event (step 102).

For example, in the case where there is a change in an IP address part of the URL, contents indicating the change in the IP address and a new URL including an IP address with the new settings are determined as the additional content 232, as described above.

For example, in the case where there is a change in a device name part of a URL, contents indicating the change in the device name and a new URL including a device name with the new settings are determined as the additional content 232.

The controller 201 (temporary page generation unit 222) which has determined the contents of the additional content 232 adds the determined additional content 232 to the standard page 233 which is associated with the URL to generate the temporary page 230 (see FIG. 6).

The temporary page 230 is generated every time a change affecting a URL occurs. Furthermore, the temporary page 230 is also implemented for the standard page 233 which is associated with another URL including an item for which a change has been made. For example, in the case where an IP address is changed, the temporary page 230 to which the additional content 232 is added is also generated for a setting screen for a device name.

Figure 8:
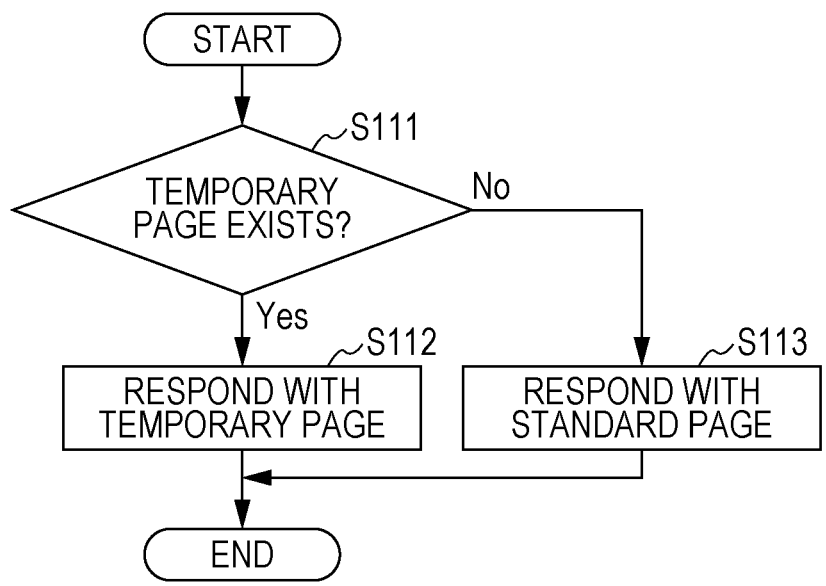
FIG. 8 is a flowchart for explaining an operation performed by the web server to determine contents to be displayed on a web browser.

FIG. 8 is a flowchart for explaining an operation performed by the web server 220 to determine contents to be displayed on the web browser 120.

The controller 201 (display contents determination unit 223) functioning as the web server 220 repeatedly monitors whether or not the temporary page 230 exists for a URL accessed by the web browser 120 (step 111). In this exemplary embodiment, an operation of the display contents determination unit 223 is performed independent of the operation illustrated in FIG. 7.

In the case where the temporary page 230 generated for the URL the access destination exists, the display contents determination unit 223 responds with the temporary page 230 generated for the corresponding URL (step 112).

In contrast, in the case where the temporary page 230 generated for the URL as the access destination does not exist, the display contents determination unit 223 responds with the standard page 233 which is associated with the corresponding URL (step 113).

The process for determining display contents illustrated in FIG. 8 may be performed in advance before access from the web browser 120.

Next, an example of a browser screen implemented by the above-described function will be explained.

Figure 9:
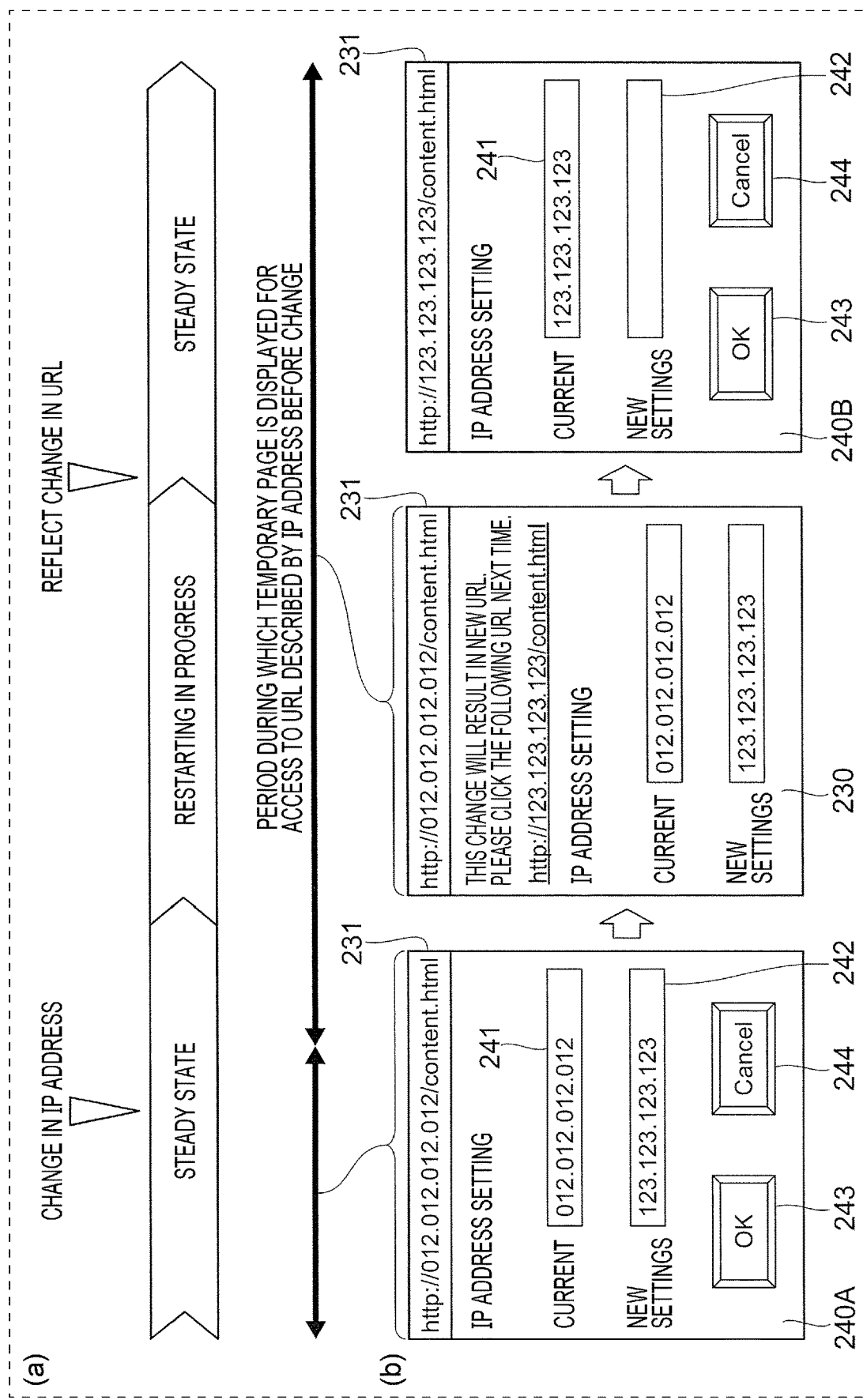
FIG. 9 is a diagram illustrating the relationship of transition of a browser screen and an operation state of the image forming apparatus in the first exemplary embodiment, where part (a) of FIG. 9 illustrates the operation state of the image forming apparatus, and part (b) of FIG. 9 illustrates transition of the browser screen.

FIG. 9 is a diagram illustrating the relationship of transition of a browser screen and an operation state of the image forming apparatus 200 in the first exemplary embodiment. Part (a) of FIG. 9 illustrates the operation state of the image forming apparatus 200, and part (b) of FIG. 9 illustrates transition of a browser screen.

In this example, a case where access is made to a setting screen for an IP address via the web browser 120 will be explained.

Before an IP address is changed, a standard page 240A is displayed as a setting screen for a URL specified by an IP address before a change (in FIG. 9, "012.012.012.012").

The standard page 240A in FIG. 9 includes a display field 241 for the current IP address, an input field 242 for an IP address with new settings, an input determination button 243, and an input cancellation button 244.

In the display field 231 for a URL which is associated with the standard page 240A, "http://012.012.012.012/content.html" is displayed.

FIG. 9 illustrates an example in which an IP address "012.012.012.012" which represents a part corresponding to a host name, a domain name, or the like of a URL is displayed. In the case where a URL is described using a host name, a domain name, or the like, display not using an IP address is used, as illustrated in FIG. 5.

Next, a case where, after setting for an IP address is changed, access to a URL before the change is made via the web browser 120 will be explained. In the case where the system is not restarted, access from the web browser 120 is guided to the temporary page 230 which is associated with the URL identified by the IP address before the change.

In the temporary page 230, information indicating that the URL has been changed and the URL with the new settings is "http://123.123.123.123/content.html" is displayed.

A user who views the temporary page 230 will understand that access should be made to "http://123.123.123.123/content.html" next time.

Even after the system is restarted, if access to the URL described by the IP address before the change is made, the temporary page 230 is displayed on the web browser 120.

In the case where access to the URL with the new settings described in the temporary page 230 is made after the system is restarted (for example, a hyperlink is clicked), a standard page 240B which is associated with the URL with the new settings "http://123.123.123.123/content.html" is displayed on the screen of the web browser 120.

In the standard page 240B displayed after the change is reflected in the system, "123.123.123.123" is displayed in the display field 241 for the IP address before the change, and the input field 242 for the IP address with the new settings is blank.

Furthermore, unlike the temporary page 230, display of the display field 231 for a URL as an access destination is switched to "http://123.123.123.123/content.html".

In the case where, unlike the example of FIG. 9, an IP address of a URL is described by a host name, a domain name, or the like, even after the system is restarted, the temporary page 230 which is associated with the URL before the change is displayed on the screen of the browser until the correspondence of a domain name system (DNS) server, which is not illustrated in figures, has been changed.

Even in such a case, by clicking a hyperlink including the IP address with the new settings, the screen of the standard page 240B may be reached.

That is, according to this exemplary embodiment, even in a case where a change in a URL is not reflected in the system side without delay, a state in which a user is able to reach a desired page without worrying about link expiration may be maintained. Consequently, user-friendliness may be improved.

Second Exemplary Embodiment

In the exemplary embodiment described above, in the case where part of a URL is changed, the temporary page 230 is generated for all the standard pages 240A affected by the change contents. However, in a second exemplary embodiment, a case where a selection as to whether or not the temporary page 230 is to be generated is made in accordance with whether or not the change in an item is reflected without delay, will be explained.

An operation for selecting content to be transmitted from the web server 220 in response to access from the web browser 120 is the same as that in the first exemplary embodiment.

FIG. 10 is a diagram for explaining an example of items for which a change is not reflected in the system without delay and items for which a change is reflected in the system without delay.

In FIG. 10, information indicating whether or not a change in a URL is reflected in the system without delay is added to the display contents illustrated in FIG. 5. As is clear from FIG. 10, a change in a folder name (folder renaming) is reflected in the system without delay.

In this exemplary embodiment, in the case where a change in a URL is reflected in the system without delay, such as the case of folder renaming, the temporary page 230 is not generated.

Figure 11:
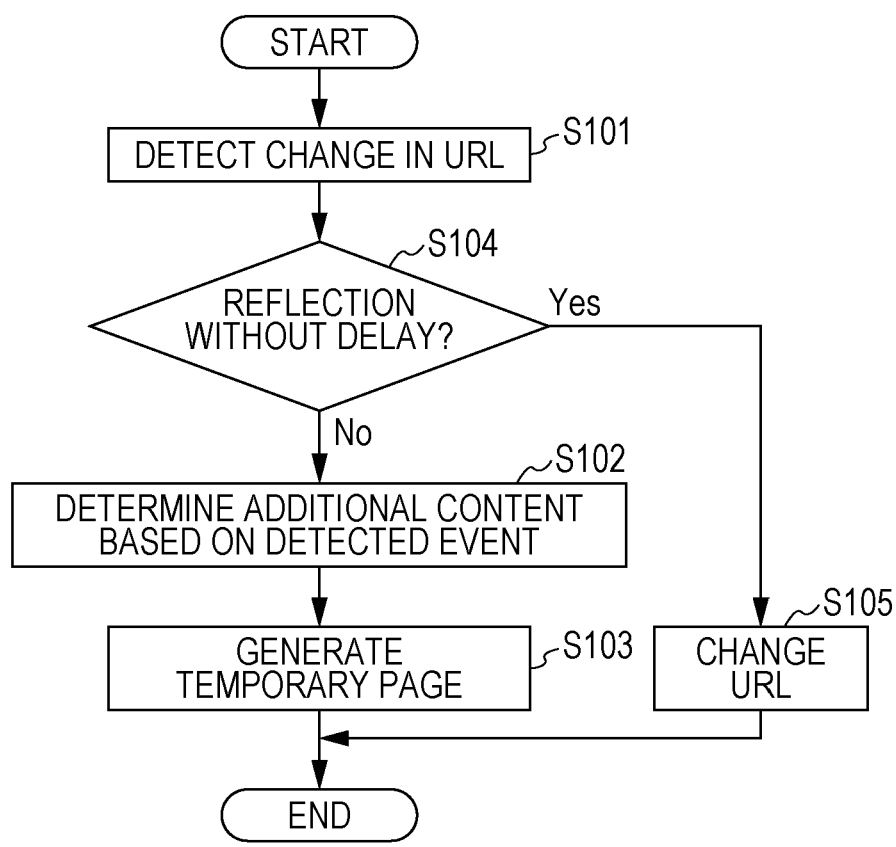
FIG. 11 is a flowchart for explaining an operation performed by a web server which has detected a change in a URL.

FIG. 11 is a flowchart for explaining an operation performed by the web server 220 which has detected a change in a URL. In FIG. 11, the same parts as those in FIG. 7 are assigned the same signs as those in FIG. 7.

The controller 201 (URL change detection unit 221) which functions as the web server 220 repeatedly monitors whether or not there is a change in the URL of a standard page under the control of the web server 220 (step 101). When a change in the URL is detected, the controller 201 proceeds to step 104. Step 104 is processing added in this exemplary embodiment.

The controller 201 (temporary page generation unit 222) which has detected the change in the URL determines whether or not the change in the URL is an event reflected in the system without delay (step 104). The controller 201 refers to the diagram illustrated in FIG. 10. FIG. 10 is represented in terms of explanation and is not necessarily in a table format in terms of data.

In the case where the detected event is an event for which a change in a URL is not reflected without delay, the controller 201 performs the same processing as that in the first exemplary embodiment. That is, the controller 201 determines additional content based on the detected event (step 102), and generates the temporary page 230 in which the determined additional content is added to the standard page 233 (see FIG. 6) (step 103).

In contrast, in the case where the detected event is an event for which a change in a URL is reflected without delay, the controller 201 changes the URL as an access destination, without generating the temporary page 230 (step 105).

Figure 12:
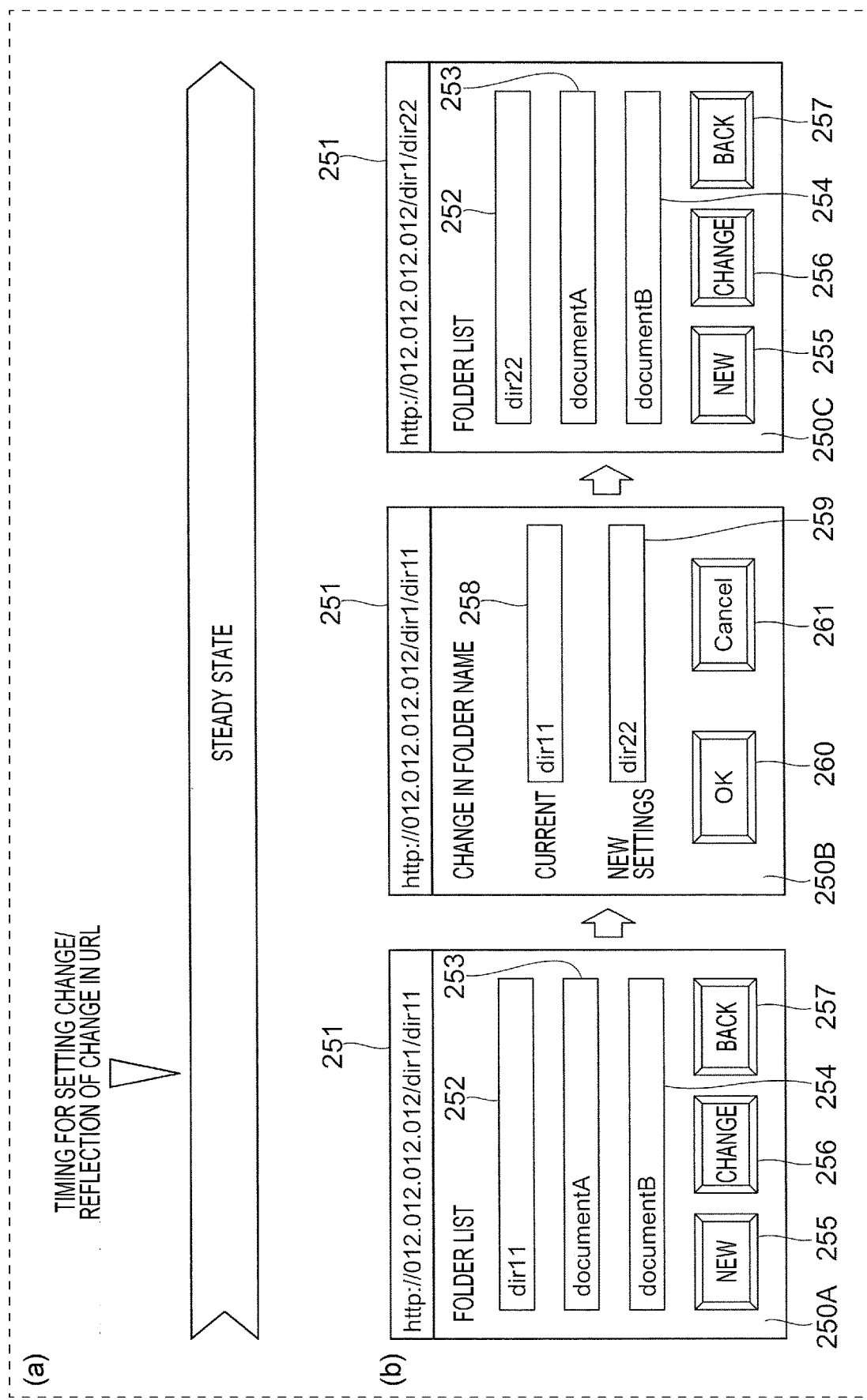
FIG. 12 is a diagram illustrating the relationship of transition of a browser screen and the operation state of an image forming apparatus in the case where a folder name is changed, where part (a) of FIG. 12 illustrates the operation state of the image forming apparatus, and part (b) of FIG. 12 illustrates transition of the browser screen.

FIG. 12 is a diagram illustrating the relationship of transition of a browser screen and an operation state of the image forming apparatus 200 in the case where a folder name is changed. Part (a) of FIG. 12 illustrates the operation state of the image forming apparatus 200, and part (b) of FIG. 12 illustrates transition of the browser screen.

Part (b) of FIG. 12 illustrates a screen in the process of changing a folder name.

In FIG. 12, the standard page 250A on the left-hand side illustrates a screen displayed on the web browser 120 before a folder name is changed, a standard page 250B in the middle illustrates a screen displayed on the web browser 120 while the folder name is being changed, and a standard page 250C on the right-hand side illustrates a screen displayed on the web browser 120 after the folder name is changed.

The standard page 250A in an example of FIG. 12 includes a display field 251 for a URL as an access destination, a folder display field 252, display fields 253 and 254 for file names, a new button 255, a change button 256, and a back button 257 for input cancellation.

The folder name in the folder display field 252 in the standard page 250A is "dir11". The display field 251 for a URL also contains "dir11".

When the change button 256 is clicked, display of the web browser 120 is switched to the standard page 250B.

The standard page 250B includes the display field 251 for a URL as an access destination, a display field 258 for the current folder name, a display field 259 for a folder name with new settings, an input determination button 260, and an input cancellation button 261.

In the standard page 250B, a state in which "dir22" as a new folder name is input in the display field 259 for a folder name with new settings is illustrated.

In this stage, the URL indicated in the display field 251 for a URL contains "dir11".

After the new folder name "dir22" is input and the input determination button 260 is clicked, display of the web browser 120 is switched to the standard page 250C without delay.

Display of the display field 251 for a URL as an access destination and the folder display field 252, which form the standard page 250C, is also switched to the display using "dir22", which is the folder name with the new settings.

As described above, in the case where a folder name is changed, an editing operation may be continued using the standard page 250C, without being conscious of restart of the system.

Also in this exemplary embodiment, in the case where an IP address or a device name is changed, the temporary page 230 (see FIG. 6) is created, and the operation explained in the first exemplary embodiment is performed.

As described above, according to this exemplary embodiment, even in the case where description of a URL is changed, if the changed contents are reflected in the system without delay, the temporary page 230 is not generated, and resources of a computer may be distributed to other types of processing.

Third Exemplary Embodiment

In the foregoing exemplary embodiments, the case where the web server 220 is provided with functions of the URL change detection unit 221, the temporary page generation unit 222, and the display contents determination unit 223 has been described. However, in a third exemplary embodiment, the case where these functions are provided in an apparatus different from the web server 220 will be explained.

Figure 13:
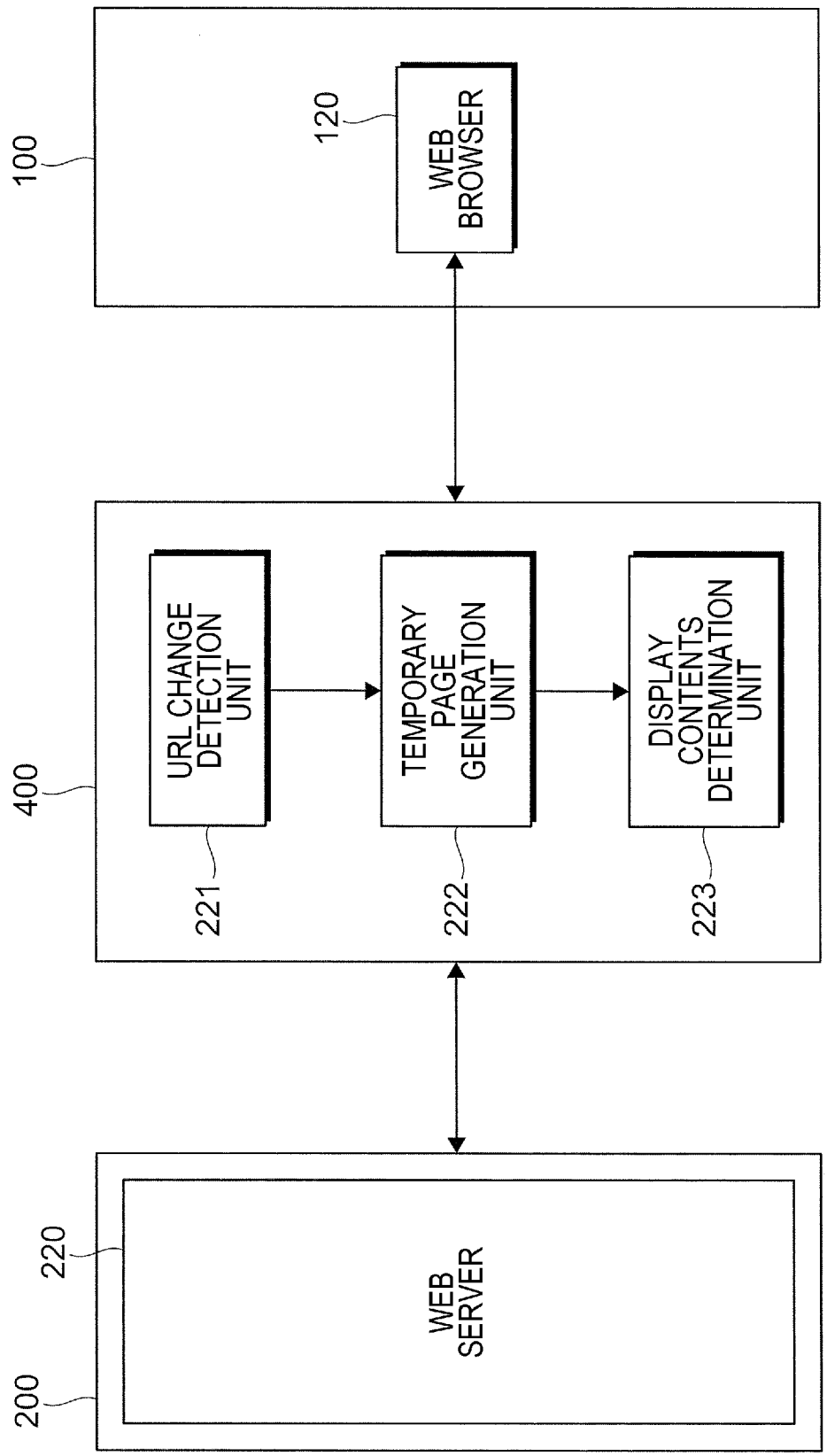
FIG. 13 is a diagram for explaining a functional configuration in a case where functions of a URL change detection unit, a temporary page generation unit, and a display contents determination unit are provided in a monitoring server which monitors communication between a web server and a web browser.

FIG. 13 is a diagram for explaining a functional configuration of a case where the functions of the URL change detection unit 221, the temporary page generation unit 222, and the display contents determination unit 223 are provided in a monitoring server which monitors communication of the web server 220 and the web browser 120. In FIG. 13, the same parts as those in FIG. 4 are assigned the same signs as those in FIG. 4.

In the case of FIG. 13, a monitoring server 400 is provided as a computer independent of the image forming apparatus 200, and performs the operation explained in the first exemplary embodiment while monitoring access to the web server 220 from the web browser 120.

As described above, in the case where the monitoring server 400 is independent of the image forming apparatus 200, even if access is made to the web server 220 from the web browser 120 while the image forming apparatus 200 is being restarted, the temporary page 230 may be displayed on the web browser 120.

However, the monitoring server 400 may be implemented as part of the function of the controller 201 provided in the image forming apparatus 200.

In FIG. 13, the monitoring server 400 is located between the web browser 120 and the web server 220. However, the web server 220 may adopt a mechanism for transferring access from the web browser 120 to the web server 220 to the monitoring server 400.

Fourth Exemplary Embodiment

In the foregoing exemplary embodiments, the temporary page 230 is displayed on the web browser 120, based on the assumption that access is made from the web browser 120. However, in a fourth exemplary embodiment, a case where the temporary page 230 is notified to a user at a time when a change in a URL occurs, will be explained.

Figure 14:
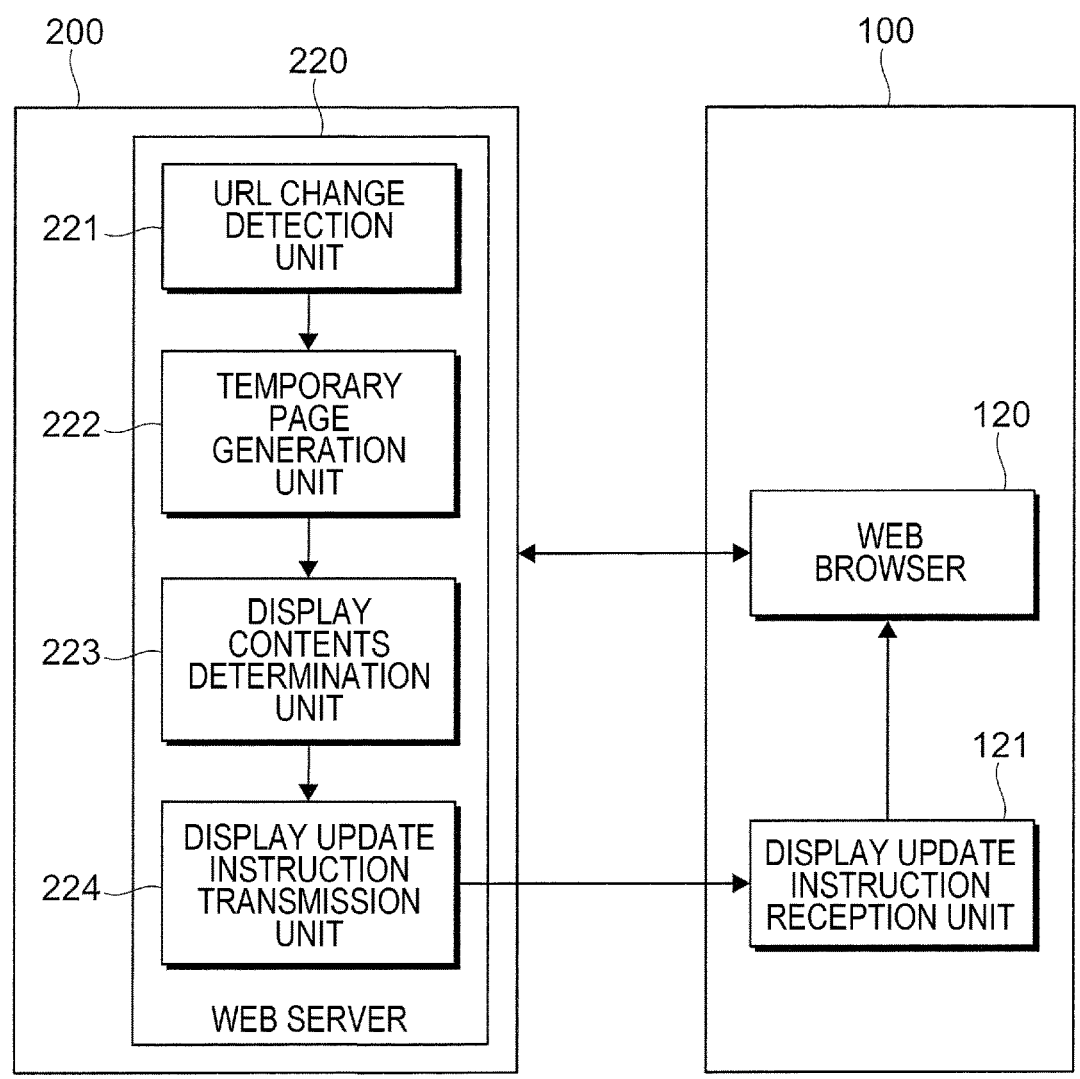
FIG. 14 is a diagram for explaining a functional configuration in a case where a web server push-distributes a generated temporary page.

FIG. 14 is a diagram for explaining a functional configuration for a case where the web server 220 push-distributes the generated temporary page 230. In FIG. 14, the same parts as those in FIG. 4 are assigned the same signs as those in FIG. 4.

A display update instruction transmission unit 224 and a display update instruction reception unit 121 are new components added to the configuration in this exemplary embodiment.

The display update instruction transmission unit 224 is a functional unit which push-transmits content determined by the display contents determination unit 223 of the image forming apparatus 200 to the computer 100.

The display update instruction reception unit 121 is a functional unit which displays content push-distributed from the web server 220 on the web browser 120.

In this exemplary embodiment, the computer 100 to be operated by a user needs to include the display update instruction reception unit 121. The display update instruction reception unit 121 may be implemented as a function of a program to be executed by the controller 101 (see FIG. 2).

Figure 15:
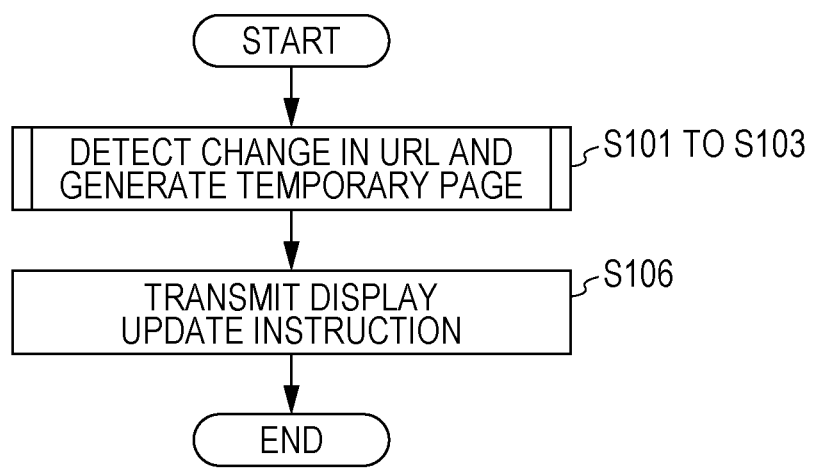
FIG. 15 is a flowchart for explaining a processing operation performed by a web server according to a fourth exemplary embodiment.

FIG. 15 is a flowchart for explaining a processing operation performed by the web server 220 according to the fourth exemplary embodiment. In FIG. 15, the same parts as those in FIG. 7 are assigned the same signs as those in FIG. 7.

The web server 220 according to this exemplary embodiment performs processing for detecting a change in a URL and generating the temporary page 230 (steps 101 to 103). In this exemplary embodiment, the processing in step 103 for determining display contents is performed without depending on access from the web browser 120.

When the details of content to be displayed on the web browser 120 are determined (when the processing of step 103 ends), the display update instruction transmission unit 224 transmits a display update instruction to the display update instruction reception unit 121 of the computer 100 (step 106). The range of a transmission destination may be determined in advance, or an unspecified large number of transmission destinations may be used, as in broadcasting.

Figure 16:
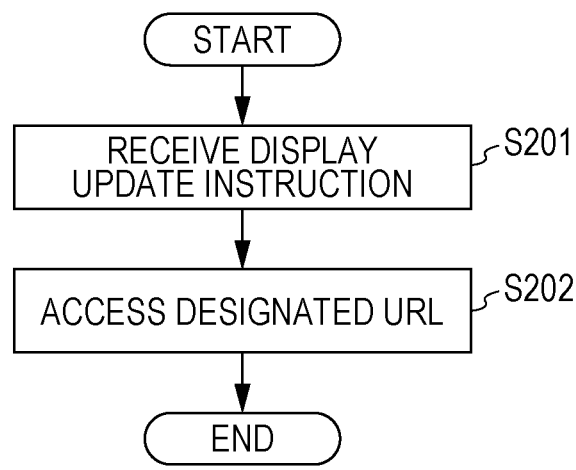
FIG. 16 is a flowchart for explaining a processing operation performed by a computer according to the fourth exemplary embodiment.

FIG. 16 is a flowchart for explaining a processing operation performed by the computer 100 in the fourth exemplary embodiment.

When the display update instruction reception unit 121 receives a display update instruction from the web server 220 (step 201), the computer 100 in this exemplary embodiment accesses a URL designated through the web browser 120 (step 202), and changes display on the screen.

As described above, display on the web browser 120 is automatically switched, and a user is thus able to know the change in the URL before access.

Furthermore, in the case where the temporary page 230 is displayed, the user is able to know the URL with the new settings contained in the temporary page 230, and is thus able to try to access the new page.

Furthermore, in the case where multiple people operate a single piece of content, notification in this exemplary embodiment may secure access to the URL with the new settings by members other than a user who edited the URL.

Other Exemplary Embodiments

Exemplary embodiments have been described above. However, the technical scope of the present invention is not limited to a range described in the foregoing exemplary embodiments. It is clear from description of the Claims that various changes and improvements made to the foregoing exemplary embodiments are also included in the technical scope of the present invention.

For example, the temporary page 230 may contain description indicating that automatic redirection to a URL with new settings is performed when a specific period of time has passed.

In this case, access to a standard page which is associated with the URL with the new settings may be made without any operation by a user.

Furthermore, the temporary page 230 may contain information regarding a timing at which access to the URL with the new settings becomes effective. For example, information regarding an expected time for the next restart may be contained in the temporary page 230.

With this information, the user is able to know in advance the timing at which the change in the URL is reflected in the system and is thus able to try to access the URL with the new settings after the change is reflected in the system.

The notification function in the fourth exemplary embodiment may be executed after the timing at which access to the URL with the new settings becomes effective.

In this case, inconvenience in that access to the URL with the new settings from the temporary page 230 is made many times before the change is reflected in the system may be reduced.

In the foregoing exemplary embodiments, the web server 220 which is provided in the image forming apparatus 200 has been illustrated. However, the function of the web server 220 may be provided in a server which provides a web service, for example, via a LAN or the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A web server apparatus that is accessed by an external device via a network, the web server comprising:
    a processor programmed to:
        provide content to be displayed in a web browser launched in the external device;
        detect a change in information to be used by the web browser to access the web server;
        in response to detecting the change, generate a temporary page that includes both (i) a new setting based on the changed information and (ii) an old setting based on the information before the change; and
        when the web browser in the external device uses the information before the change to access the web server, cause the web browser in the external device to display the temporary page.

2. The web server apparatus according to claim 1, wherein the temporary page is transmitted in response to the web browser in the external device requesting to access the web server using the information before the change.

3. The web server apparatus according to claim 2, wherein the temporary page contains a link to the information after the change with the new setting.

4. The web server apparatus according to claim 2, wherein the temporary page contains a description which suggests that the information after the change with the new setting should be used next time the web browser in the external device tries to access the web server.

5. The web server apparatus according to claim 2, wherein in a case where the temporary page is not generated by the web server, a standard page that includes (ii) the old setting without the (i) new setting is transmitted in response to the web browser in the external device requesting to access the web server using the information before the change.

6. The web server apparatus according to claim 2, wherein the temporary page contains a description indicating that access using the information after the change with the new setting is automatically made after a predetermined time has passed.

7. The web server apparatus according to claim 2, wherein the temporary page contains information regarding a timing at which access using the information after the change with the new setting becomes effective.

8. The web server apparatus according to claim 1, wherein in a case where the change in the information is reflected in a system without delay, the temporary page is not generated.

9. The web server apparatus according to claim 1, wherein in a case where the temporary page is generated, the temporary page is transmitted to a client apparatus even when a web browser in the client apparatus has not made a request to access the web server using the information before the change.

10. The web server apparatus according to claim 8, wherein
    when access using the information after the change with the new setting becomes effective, the temporary page is transmitted to a client apparatus.

11. The web server apparatus according to claim 1, wherein the processor is programmed to:
    for a predetermined period of time after detecting the change in the information to be used by the web browser in the external device, cause the web browser in the external device to display the temporary page that includes both (i) the new setting and (ii) the old setting; and
    after the predetermined period of time has passed after detecting the change, cause the web browser in the external device to display a standard page that includes only the new setting without the old setting.

12. The web server apparatus according to claim 1, wherein
    the detected change is at least one of:
        a change in an IP address of the web server,
        a change in a device name of the web server, and
        a change in a folder name representing a storing location in the web server.

13. An image forming apparatus comprising:
    an image forming unit that forms an image on a recording material; and
    a web server apparatus that is accessed by an external device via a network and transmits content in response to access from the external device, wherein the web server apparatus or a second server apparatus that monitors the web server apparatus includes:

a processor programmed to:
  provide the content to be displayed in a web browser launched in the external device;
  detect a change in information to be used by the web browser to access the web server;
  in response to detecting the change, generate a temporary page that includes both (i) a new setting based on the changed information and (ii) an old setting based on the information before the change; and
  when the web browser in the external device uses the information before the change to access the web server, cause the web browser in the external device to display the temporary page.

14. A server system comprising:
a web server apparatus that that is accessed by an external device via a network and includes a processor programmed to:
  provide content to be displayed in a web browser launched in the external device;
  detect a change in information to be used by the web browser to access the web server;
  in response to detecting the change, generate a temporary page that includes both (i) a new setting based on the changed information and (ii) an old setting based on the information before the change; and
  when the web browser in the external device uses the information before the change to access the web server, transmit the temporary page to the external device; and
the external device that displays, in a case where the temporary page is received, the temporary page on the web browser.

* * * * *